(12) United States Patent
Lechnick et al.

(10) Patent No.: US 7,935,178 B2
(45) Date of Patent: May 3, 2011

(54) USE OF A BIPHASIC TURBINE IN A PROCESS FOR RECOVERING ENERGY IN GASIFICATION AND NATURAL GAS APPLICATIONS

(75) Inventors: William J. Lechnick, Glen Ellyn, IL (US); Paul A. Sechrist, South Barrington, IL (US); Douglas E. Kuper, Chicago, IL (US); Lamar A. Davis, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 508 days.

(21) Appl. No.: 12/055,895

(22) Filed: Mar. 26, 2008

(65) Prior Publication Data
US 2009/0241779 A1 Oct. 1, 2009

(51) Int. Cl.
*B01D 53/14* (2006.01)

(52) U.S. Cl. ............ 95/172; 95/177; 95/192; 95/208; 95/236

(58) Field of Classification Search .......... 95/186, 95/192, 172, 177, 208, 236; 96/155, 234
See application file for complete search history.

(56) References Cited

U.S. PATENT DOCUMENTS

| | | | | |
|---|---|---|---|---|
| 2,926,752 A * | 3/1960 | Redemann et al. | ............ | 95/163 |
| 3,594,985 A * | 7/1971 | Ameen et al. | ............ | 95/163 |
| 4,298,311 A * | 11/1981 | Ritzi | ............ | 415/80 |
| 4,345,918 A * | 8/1982 | Meissner | ............ | 95/179 |
| 4,414,003 A | 11/1983 | Blaudszun | | |
| 5,067,972 A * | 11/1991 | Hemmings et al. | ............ | 95/173 |
| 5,525,034 A | 6/1996 | Hays | ............ | 415/80 |
| 5,983,663 A | 11/1999 | Sterner | ............ | 62/620 |
| 6,174,348 B1 | 1/2001 | Ahmed et al. | | |
| 6,342,091 B1 * | 1/2002 | Menzel et al. | ............ | 95/167 |
| 7,093,503 B1 * | 8/2006 | Hays et al. | ............ | 73/861.79 |
| 7,309,382 B2 * | 12/2007 | Cadours et al. | ............ | 95/172 |
| 7,377,127 B2 * | 5/2008 | Mak | ............ | 62/630 |
| 7,384,541 B2 * | 6/2008 | Charron et al. | ............ | 208/212 |
| 2004/0003717 A1 * | 1/2004 | Gaskin | ............ | 95/176 |
| 2004/0206112 A1 | 10/2004 | Mak | ............ | 62/617 |
| 2005/0029165 A1 | 2/2005 | Charron et al. | ............ | 208/212 |
| 2005/0098036 A1 | 5/2005 | Cadours et al. | ............ | 95/172 |
| 2005/0172807 A1 * | 8/2005 | Mak | ............ | 95/235 |
| 2007/0006731 A1 * | 1/2007 | Menzel | ............ | 95/236 |
| 2008/0223214 A1 * | 9/2008 | Palamara et al. | ............ | 95/160 |

OTHER PUBLICATIONS

"Investigation of the Feasibility of a Biphase Turbine for Industrial Process Energy Recovery" by N. Helgeson, Report (1985), DOE/ID/12357-TI; Order No. DE86000010, 466 pp. (abstract only).
"Recovery of Power from Flashing Gas-Hydrocarbon Solutions with the Biphase Turbine" by N. L. Helgeson et al., I Mech E Conference Publications (1984), (2), 235-45 (abstract only).

* cited by examiner

*Primary Examiner* — Duane Smith
*Assistant Examiner* — Ives Wu
(74) *Attorney, Agent, or Firm* — Mark Goldberg

(57) ABSTRACT

The invention provides a process and system for regenerating a solvent used to remove carbon dioxide from feed gases, such as natural gas and synthesis gas. The process and system employ a biphasic turbine to recover energy following pressure let down.

4 Claims, 1 Drawing Sheet

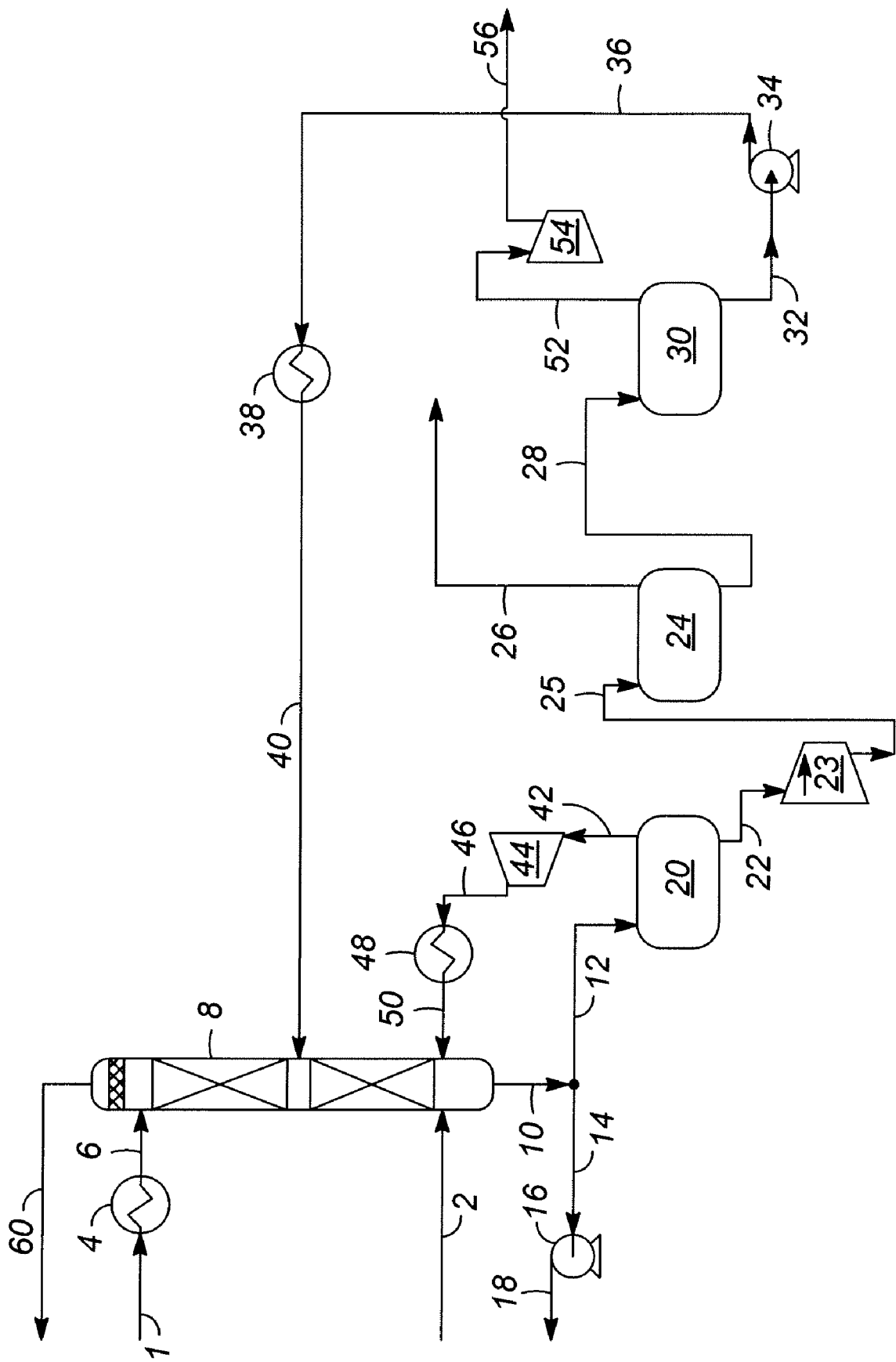

USE OF A BIPHASIC TURBINE IN A PROCESS FOR RECOVERING ENERGY IN GASIFICATION AND NATURAL GAS APPLICATIONS

BACKGROUND OF THE INVENTION

This invention is related to the removal of acid gases from a feed gas. More particularly the invention relates to acid gas removal from high carbon dioxide and hydrogen sulfide containing feed gases. A process is provided for reduced energy requirements in the regeneration of the solvent used to remove the acid gases.

Processing of a gas, for example natural gas, synthesis gas, combustion gas from integrated combined cycles generally involves removal of impurities such as nitrogen, ammonia, and acid components such as carbon dioxide, hydrogen sulfide, sulfur dioxide COS, $CS_2$ and mercaptans. These impurities are present in various proportions depending on the origin of the gas. In the case of natural gas, $CO_2$ and $H_2S$ can be present as traces, some ppm, but they can also represent a very significant proportion of the raw gas, up to 70% by volume. Various techniques can be used to remove these impurities. Absorption systems are commonly used for the removal of $CO_2$ from the natural gas. A physical solvent such as a dimethylether of polyethylene glycol (DMPEG) can be used to wash out carbon dioxide. DMPEG solvents are used in systems licensed by UOP LLC under the trademark Selexol™. The $CO_2$ rich solvent is subsequently regenerated by flashing and/or by stripping of $CO_2$ with heat, steam, or other stripping gas which can include hydrogen, nitrogen, or air among others. Cryogenic methanol systems are also known to those skilled in the art for this use including the Rectisol™ process currently licensed by Lurgi AG. Other physical solvents that may be used include a mixture of N-formyl and N-acetyl morpholine, N-methyl-2-pyrrolidone and sulfolane.

After absorption of carbon dioxide and/or hydrogen sulfide and/or carbonyl sulfide by a physical solvent, the solution is regenerated to remove absorbed gases. The regenerated physical solvent can then be recycled for further absorption. Absorption and regeneration are usually carried out in different separator columns or drums containing packing or bubble plates for efficient operation. Regeneration is generally achieved in two stages. First, the absorbent solution's pressure is reduced so that absorbed carbon dioxide is vaporized from the solution in one or more flash regenerating columns or drums, the last flash drum sometimes being a vacuum flash drum. Next, the flashed absorbent is stripped with steam or some other stripping gas in a stripping regenerating column to remove residual absorbed carbon dioxide. Low carbon dioxide levels are needed in order to achieve the required carbon dioxide specifications for treated gas.

The absorption processes that employ physical solvents involve typical pressures from 2758 to more than 6205 kPa (400 to 900 psia) and solvent flow rates in the carbon dioxide removal section of greater than 10,000 gpm. This results in significant electricity requirements for the solvent pumps that are used. Some of this energy is recoverable from the solvent during pressure let down via turbines. However, the large solvent rates and the release of carbon dioxide during the pressure let down generally means that two or more conventional turbines are required to adequately recover this energy. The capital costs associated with multiple turbines generally makes this option economically unattractive. The high solvent rates also result in the need for large diameter gravity-driven vapor-liquid separators for flash regeneration of the solvent. In addition to the capital costs, there are significant costs associated with the initial solvent inventory for each separator.

These and other issues with prior art systems are dealt with in the present invention which employs a biphasic turbine to recover energy in gasification and natural gas applications and eliminates the need for multiple conventional turbines to recover energy.

SUMMARY OF THE INVENTION

The present invention involves the use of a biphasic turbine in a process that employs physical solvents for removal of acid gases from gasification syngas or natural gas. The biphasic turbine eliminates the need for multiple turbines because of its flexibility in handling liquids, gases or two-phase flows. This invention is applicable to any process in which flash regeneration of a solvent used in a high pressure process is sought.

The present invention is a process for treating a carbon dioxide containing gas comprising contacting the gas with a solvent absorbing the impurities so as to obtain an impurity-laden solvent and a scrubbed gas, sending the impurity-laden solvent through a recycle flash drum, expanding the impurity-laden solvent through a biphasic turbine so as to release an amount of impurities in gaseous form and to obtain an impurity-depleted solvent, and recirculating said semi-lean solvent stream to said absorber unit. The present invention also is a system for removal of carbon dioxide from a carbon dioxide containing solvent comprising a carbon dioxide absorber, a carbon dioxide recycle flash drum, a biphasic turbine and a carbon dioxide venting apparatus.

The invention is generally applicable to physical solvents for which a flash is used in the regeneration of the solvent stream to produce a solvent stream that contains almost no acid gas. Among the physical solvents that can be used are a dimethylether of polyethylene glycol (DMPEG), methanol, a mixture of N-formyl and N-acetyl morpholine, N-methyl-2-pyrrolidone and sulfolane. Dimethylether of polyethylene glycol is a preferred solvent for use in the present invention.

BRIEF DESCRIPTION OF THE DRAWING

The FIGURE shows the use of the biphasic turbine in a gas treating process.

DETAILED DESCRIPTION OF THE INVENTION

The use of a biphasic turbine has been found to eliminate the need for multiple turbines in recovering the energy following the pressure let down. The large solvent flow rates and the release of carbon dioxide during the pressure let down has previously required the use of multiple turbines to recover energy. The biphasic turbine eliminates the need for multiple turbines because of its flexibility in handling liquids, gases or two-phase flows. The turbine can be placed anywhere in the process where pressure let down occurs. However, the optimum placement of the turbine is downstream from the flash drum in the carbon dioxide removal section that is used to recover some of the coabsorbed hydrogen and carbon monoxide or in the liquid line from the next vessel downstream. The pressure let down that occurs at these two points can be equivalent to as much as 10 to 15% of the total electricity requirements for the process. Calculations for a typical process indicated that 5 to 6 mW were recoverable versus a total process electricity requirement of 35 mW. During this let down, as much as 70 to 80% of the dissolved carbon dioxide vaporizes. This carbon dioxide accounts for from 5 to 20 wt-% of the solution. Conventional turbines are unable to handle the change in the mixture from a single liquid phase to a combination liquid-gas phase. The biphasic turbines' flexibility with respect to the fluid phase eliminates the problem.

The biphasic turbine also reduces the required diameters for vapor-liquid separators by providing significant vapor-liquid separation during the pressure let down process. The smaller separators reduce the capital and initial solvent inventory costs. Biphasic turbines are described in a number of patents including U.S. Pat. No. 4,298,311; 5,525,034 and 7,093,503 B 1, all of which are incorporated by reference herein in their entireties.

A system shown in the FIGURE shows a lean solvent 1 that has a low level of acid gases is chilled by lean solvent chiller 4. The chilled lean solvent 6 enters carbon dioxide absorber unit 8 to contact a feed gas shown as entering carbon dioxide absorber unit through line 2. The contact of the chilled lean solvent with the feed gas results in a rich solvent exiting the bottom of the carbon dioxide absorber unit 8 through line 10. A portion of the loaded solvent passes through line 14 to rich solvent pump 16 and then exits this portion of the process through line 18 where the rich solvent is sent either to another absorber unit to remove other impurities such as hydrogen sulfide or to be regenerated. The remaining portion of the loaded solvent is sent through line 12 to be flashed in recycle flash drum 20 so that a portion of the carbon dioxide exits the top of the recycle flash drum 20 through line 42 to be compressed in recycle compressor 44, go through line 46, cooled in cooler 48 and then reenter carbon dioxide absorber unit 8 through line 50. The partially regenerated solvent leaves recycle flash drum 20 through line 22 and then goes to biphasic turbine 23. Then the partially regenerated solvent goes through line 25 to vent drum 24. Some of the carbon dioxide is vented from vent drum 24 through line 26. The partially regenerated solvent from vent drum 24 passes through line 28 to vacuum drum 30 to produce a semi-lean solvent that flows through line 32 to solvent pump 34 and a gaseous carbon dioxide portion that passes through line 52 to vacuum compressor 54 and then exits the system through line 56. The semi-lean solvent then continues through line 36 to semi-lean solvent chiller 38 and then through line 40 to carbon dioxide absorber unit 8. Also shown in the drawing is the treated gas leaving the top of carbon dioxide absorber unit 8 through line 60.

Other embodiments may be employed that employ the basic principles of the present invention.

The invention claimed is:

1. A process for treating a carbon dioxide containing gas comprising the steps of:
   a) contacting the gas with a solvent in an absorber unit absorbing impurities so as to obtain an impurity-laden solvent and a scrubbed gas;
   b) sending the impurity-laden solvent through a carbon dioxide recycle flash drum removing a portion of carbon dioxide that is then compressed, cooled and recirculated to the absorber unit;
   c) expanding the impurity-laden solvent through a biphasic turbine so as to release an amount of the impurities in gaseous form and to obtain an impurity-depleted solvent for producing a semi-lean solvent stream; and
   d) recirculating the semi-lean solvent stream to the absorber unit.

2. The process of claim 1, wherein after passing through the biphasic turbine, the impurity-depleted solvent containing a gas liquid mixture is passed to a carbon dioxide vent drum to vent carbon dioxide.

3. The process of claim 1, wherein the solvent is selected from the group consisting of dimethylether of polyethylene glycol, methanol, a mixture of N-formyl and N-acetyl morpholine, N-methyl-2-pyrrolidone and sulfolane.

4. The process of claim 1, wherein the process requires about 10 to 15 percent less electricity than a comparable process without the biphasic turbine.

* * * * *